Aug. 21, 1962
C. P. MITCHELL
3,049,923
RECORDING THERMOMETERS
Filed Dec. 30, 1957
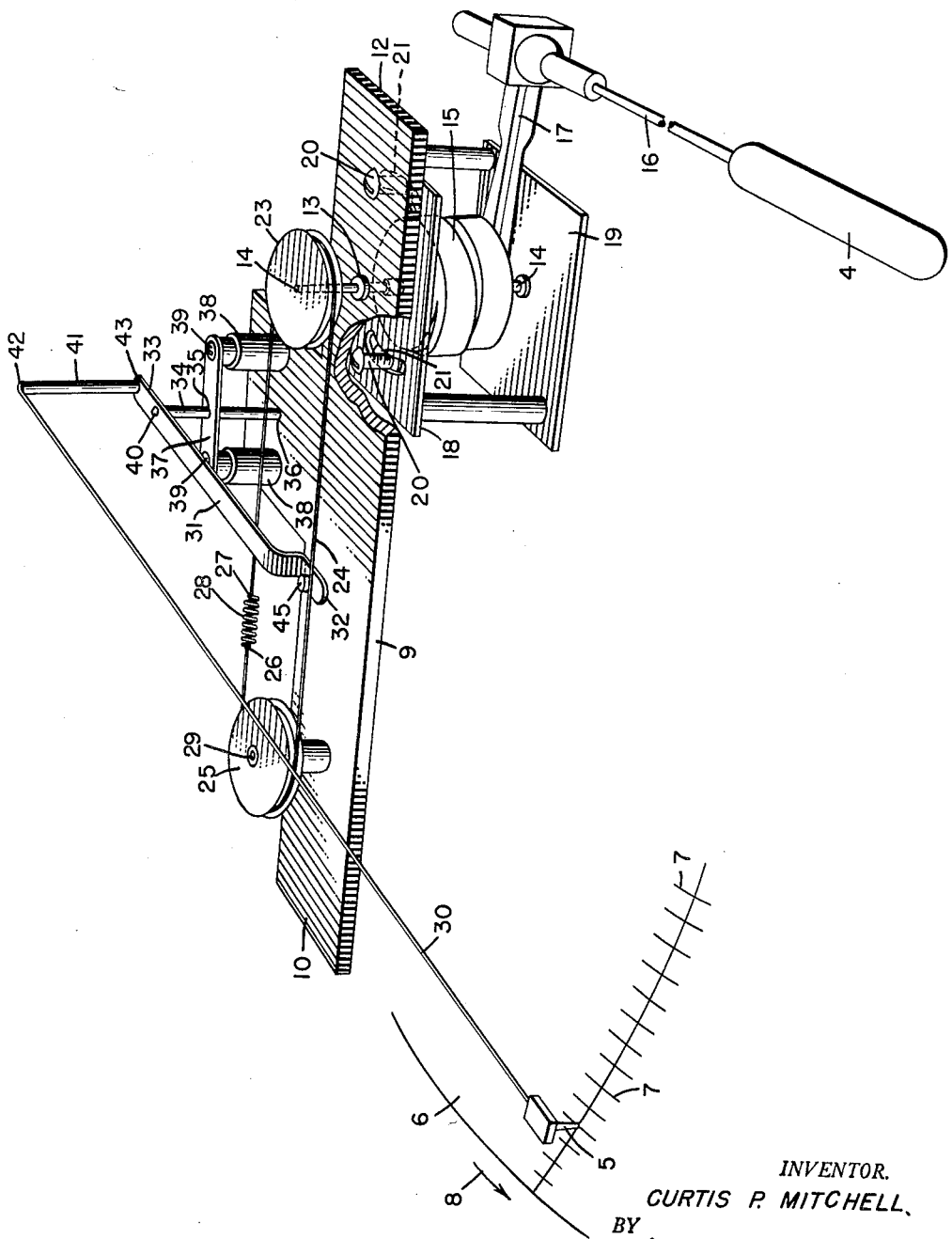
INVENTOR.
CURTIS P. MITCHELL,
BY
*Warren Kinney Jr*
ATTORNEY

United States Patent Office 3,049,923
Patented Aug. 21, 1962

3,049,923
RECORDING THERMOMETERS
Curtis P. Mitchell, North College Hill, Ohio, assignor to Palmer Thermometers, Inc., Norwood, Ohio, a corporation of Ohio
Filed Dec. 30, 1957, Ser. No. 706,054
2 Claims. (Cl. 73—343.5)

The present invention relates to an improvement in recording thermometers, such as are adapted for use in refrigerated trucks or other vehicles carrying perishable merchandise. It is common practice for carriers of perishables to equip their vehicles with refrigerating apparatus, and thermometers which produce a continuous record of temperature within the freight compartment, in order to protect the carriers against false claims of negligence in transit, for perishable goods spoiled on delivery at destination.

Recording thermometers for the purpose stated are required to operate under adverse conditions involving vibration and jarring which become quite severe, as the vehicle travels at high speed or encounters roadways poorly surfaced. Under such conditions, the marking pen or scribe of the apparatus produces a temperature record which is inaccurate or confused, often resulting in doubt as to proper interpretation of the graphic record produced. The graphic record to be most desired is one which indicates properly the temperature of the refrigerated or conditioned compartment at all times, unaffected by recordings of extraneous conditions such as roadway irregularities, vibrations of various kinds, and similar factors having no relationship to temperature of the freight compartment.

An object of the present invention is to incorporate in a recording thermometer improvements of structure which practically eliminate the recording of conditions foreign to the temperature variations in the refrigerated compartment of a transport vehicle.

Another object of the invention is to control simply and inexpensively the movements of the pen or scribe of a recording thermometer, for the purposes above stated.

A further object is to provide an improved recording thermometer having the advantages noted, which is dependable and durable, the construction being such that no extraordinary maintenance or servicing is required for keeping the device in proper working condition.

The foregoing and other objects are attained by the means described herein and illustrated upon the accompanying drawing, in which:

The FIGURE is a perspective view of the improved recording thermometer, parts of the apparatus being broken away.

In the drawing, 4 indicates the usual thermometer bulb or other temperature responsive element to be located inside the refrigerated or temperature-controlled compartment, and 5 is a pen or scribe operative upon a continuously moving chart sheet 6 to record the temperature of the bulb or any variations thereof. The chart sheet 6 may be one of usual design, having graduations or scale markings 7 indicative of different temperatures. By means of a clock mechanism of the like, not shown, the chart is moved in the direction of the arrow 8, so that the scribe applies a mark or line continuously upon the chart as the chart moves relative to the scribe. As is customary, the chart may be moved at a timed rate so as to indicate the period of time that the refrigerated merchandise is in transit.

The chassis of the apparatus may comprise a rigid plate or support element 9 having opposite ends 10 and 12, and near one end such as 12, the plate element may be apertured at the location 13 to permit the shaft 14 of a pressure responsive device 15 to extend through for free rotation. The pressure responsive device 15 may be a Bourdon gauge or similar apparatus, the function of which is to translate varying pressures of a fluid in bulb 4, into correspondingly variable degrees of rotation of the upright shaft 14. Variations of fluid pressure in the bulb 4 resulting from temperature changes applied to the bulb, may be transmitted to the Bourdon gauge 15 by means of capillary tubes 16 and 17 connecting the gauge coil and the bulb.

The characters 18 and 19 indicate a pair of spaced plates upon which the Bourdon gauge is mounted, the plate 18 being in turn secured to the under face of support member 9 in any suitable manner, as by means of screws 20. In order to provide for simple adjustment of the scribe to the chart graduations when necessary, plate 18 may be provided with arcuate slots 21, 21 which receive the screws 20. Upon loosening the screws, the plate assembly 18—19 may be bodily rotated relative to support member 9, to coordinate the position of scribe 5 with a master thermometer and the graduations of chart 6, to ensure accuracy of recording.

As will be understood, changes in temperature and pressure of fluid within the bulb 4 and the coil of gauge 15 result in rotational movements of the gauge shaft 14. To the shaft is fixed a lateral 23, which may be a pulley as shown, or an arm or lever, operative upon a cord 24 or similar element for reciprocatory movement induced by rotation of shaft 14. In the example illustrated, the cord 24 is trained about the grooved peripheries of pulley 23 and a second pulley 25, the ends 26 and 27 of the cord being joined by an elastic element 28 which may be in the form of a tension spring operative to keep the cord always in a taut condition. The cord should be one which is relatively insensitive to changes of temperature and humidity, so that stretching or contracting of the cord is minimal, or nil in amount, if possible. Nylon cord has been found quite acceptable for the purpose, but cords of other material having the desired characteristics may be substituted therefor.

The pulley 25 may be mounted for free rotation upon an upright shaft 29 secured to plate 9. As previously indicated, the pulley might be replaced by a lever or arm extending laterally from shaft 29, if desired. Because of this possibility of obvious substitution, the element 25 may properly be referred to as a lateral, or a lateral member, on the idler shaft 29.

From the foregoing, it will be understood that slight rotational movements of the Bourdon gauge shaft 14 are translated into reciprocatory movements of cord 24, with magnification of the cord movement.

Linear movements of the cord 24 are transmitted to the scribe arm 30, and mechanism for this purpose may include a rocker arm 31 having a forward 2nd 32 and a rear end 33, between which ends is secured a rocker shaft or pivot 34 supported in suitable vertically aligned bearings 35 and 36. Bearing 36 may be simply an aperture in the plate or support 9, whereas bearing 35 may be an aperture in a cross head 37 supported in spaced relation with plate 9 by means of stools 38—38 to which the cross head is secured, as by means of screws or other fasteners 39. Rocker shaft 34 may be welded, riveted, or otherwise suitably fixed to the rocker arm 31 at approximate right angles thereto, at a point 40 near the rear end 33 of the rocker arm. An upstanding rigid post 41 fixed to the rocker arm at a distance from the pivot shaft 34, carries the laterally disposed pen or scribe arm 30. The connections 42 and 43 at opposite ends of post 41 are fixed, and the scribe arm 30 preferably is a rigid wire or rod of metal lightly bearing upon the chart sheet 6.

At its forward end 32, the rocker arm 31 carries a suitable fastener 45 whereby a tight connection may be made with the cord 24, to enforce movement of the rocker arm with the cord. Fastener 45 may be of any desired form, a binding post being shown by way of example. As will be understood, slight rotary movements of the Bourdon gauge shaft 14 will be transmitted and magnified by the linkage constituted of the elements 23, 25, 24, 31, 41 and 30, causing the scribe or pen 5 to shift laterally of the scale markings 7 as the chart moves in the direction of arrow 8, to produce a continuous record of the temperature maintained in a compartment housing the bulb 4.

The effect of the linkage as disclosed is to effectively dampen and stabilize all vibrations or jolts directed to the instrument by reason of vehicular movement, particularly with respect to the coil of the Bourdon gauge which normally is sensitive to such extraneous forces and transmits them undesirably to the pen or scribe. Sharp jolts or vibrations are effectively absorbed by the spring 28, the cord to which it is attached, and the mass of the linkage elements, so that erratic action of the scribe is practically eliminated and a much improved record is produced upon the chart 6.

It is to be understood that various modifications and changes in the structural details of the device may be made, within the scope of the appended claims, without departing from the spirit of the invention.

What is claimed is:

1. A recording thermometer for cooperation with a recording chart sheet and adapted for transport service, comprising a support plate, a pair of stools secured to the plate, a cross head, means securing the cross head to the stools and spaced thereby from the plate, an arm pivot journaled in the plate and in the cross head and projecting outwardly beyond the cross head, a rocker arm rigidly secured to the pivot having a portion extending forwardly in spaced overlying relation to the plate, a scribe arm secured to and movable with the rocker arm, said scribe arm being of greater length than the rocker arm and projecting therebeyond, and control means variably to position the scribe arm carried by the plate including a plate assembly having upper and lower spaced plates and connecting means therefor, a Bourdon gauge and actuating means therefor including a temperature responsive element and coupled capillary gauge connected tubes carried by the assembly, a gauge pressure rotatable shaft carried by the gauge extending from the assembly through the plate and projecting above the plate, a lateral secured to the projecting portion of the shaft, operating connections between the lateral and the rocker arm for moving the rocker arm and scribe arm in accordance with Bourdon gauge effected movements of the lateral, and means for adjusting the angular relation of the lateral and thus the rocker and scribe arms relative to the support plate, said means including fasteners carried by the support plate engaged in arcuate slots formed in the upper plate of the assembly.

2. A recording thermometer as specified in claim 1, in which the lateral is in the form of a grooved pulley, a second grooved idler pulley is rotatably supported on the plate at a point removed from the lateral, and the operating connections between the lateral and the rocker arm include a cord trained about the grooved pulleys, an elastic element joining the ends of the cord to keep the cord in taut condition, and a fastener tightly connecting the rocker arm to the cord for joint movement as effected by the gauge.

References Cited in the file of this patent

UNITED STATES PATENTS

| | | |
|---|---|---|
| 2,063,166 | Jansse | Dec. 8, 1936 |
| 2,043,590 | Norwood | June 9, 1936 |
| 2,379,328 | Weingart | June 26, 1945 |
| 2,386,164 | Hurley | Oct. 2, 1945 |
| 2,596,305 | Stevens | May 13, 1952 |
| 2,830,452 | Biro | Apr. 15, 1958 |